(12) United States Patent
Nanlawala et al.

(10) Patent No.: US 6,715,269 B2
(45) Date of Patent: Apr. 6, 2004

(54) ADJUSTABLE MONITOR MOUNT

(75) Inventors: Sajid Nanlawala, Chicago, IL (US);
Diane E. Svanson, Lake Zurich, IL (US); Thomas L. Howard, Chicago, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/197,038

(22) Filed: Jul. 17, 2002

(65) Prior Publication Data

US 2004/0011015 A1 Jan. 22, 2004

(51) Int. Cl.⁷ ................................................ A01D 75/28
(52) U.S. Cl. ................ 56/10.2 R; 180/329; 180/89.12; 296/190.01
(58) Field of Search ............................ 180/329, 89.12, 180/326, 324; 296/190.01; 56/10.2 R

(56) References Cited

U.S. PATENT DOCUMENTS

| 4,708,312 A | * | 11/1987 | Rohr | 248/281.11 |
| 5,335,142 A | * | 8/1994 | Anderson | 361/681 |
| 5,793,420 A | * | 8/1998 | Schmidt | 348/148 |
| 6,039,141 A | * | 3/2000 | Denny | 180/329 |

* cited by examiner

Primary Examiner—Árpád Fábián Kovács
(74) Attorney, Agent, or Firm—Rebecca Henkel; Brant T. Maurer

(57) ABSTRACT

An agricultural harvesting machine includes an operator station. The operator station provides an operator console. An adjustable mount provides a swivel and tilt adjustment for an electronic display panel connected to the console. Adjustment is provided by an elongated member with a first end pivotably connected to the operator console. The elongated member is pivotable about a first axis. An ICDU is pivotably attached to the elongated member and is pivotable about a second axis orthogonal to the first axis.

23 Claims, 6 Drawing Sheets

ADJUSTABLE MONITOR MOUNT

BACKGROUND

This disclosure relates generally to heavy equipment and more particularly to an adjustable mount for a monitor display to allow the operator to adjust the position of the monitor as needed during equipment operation.

Heavy equipment systems indicators have progressed from dashboard mounted analog instruments to digital displays that allow the operator to monitor the functions of the equipment. Flexible integrated combine display units (ICDU's) are used to report to the farm equipment/combine operator, data that includes internal information (e.g. ground speed, oil pressure, and engine temperature), operations information (e.g. rotor speed and grain loss), and manufacturer proprietary systems information (e.g. Advanced Farming Systems (AFS) information including yield mapping and position data).

Current combines do not offer an acceptable method of adjusting the position of monitors/displays with respect to the operator. The ICDU is often a far reach from the operator. It can also be difficult to read when sunlight is shining into the cab at certain angles. The ICDU can also partially block outward visibility of certain components, such as the feeder, header or after-cut areas. The ability to see these components is particularly important in many applications.

Therefore, what is needed is an adjustable mount for an ICDU that maximizes the readability and accessibility of the ICDU while also allowing for adjustment of the ICDU so as to provide a full outward view of critical components such as a feeder, header or after-cut areas.

SUMMARY

One embodiment, accordingly, provides an adjustable mount for quickly and easily positioning an ICDU such as in an agricultural harvesting machine. To this end, a control console includes a base and a control member. A first swivel member is pivotally connected to the base for movement about a first axis. A second tilt member supports the ICDU which is pivotally connected to the swivel member for movement about a second axis which is different from the first axis.

A principal advantage of this embodiment is that the adjustable mount may be pivoted about a first axis in and out of the range of visual scan of the crop collecting means, and about a second axis to allow the optimum viewing angle of the ICDU.

DETAILED DESCRIPTION

Figure 1:
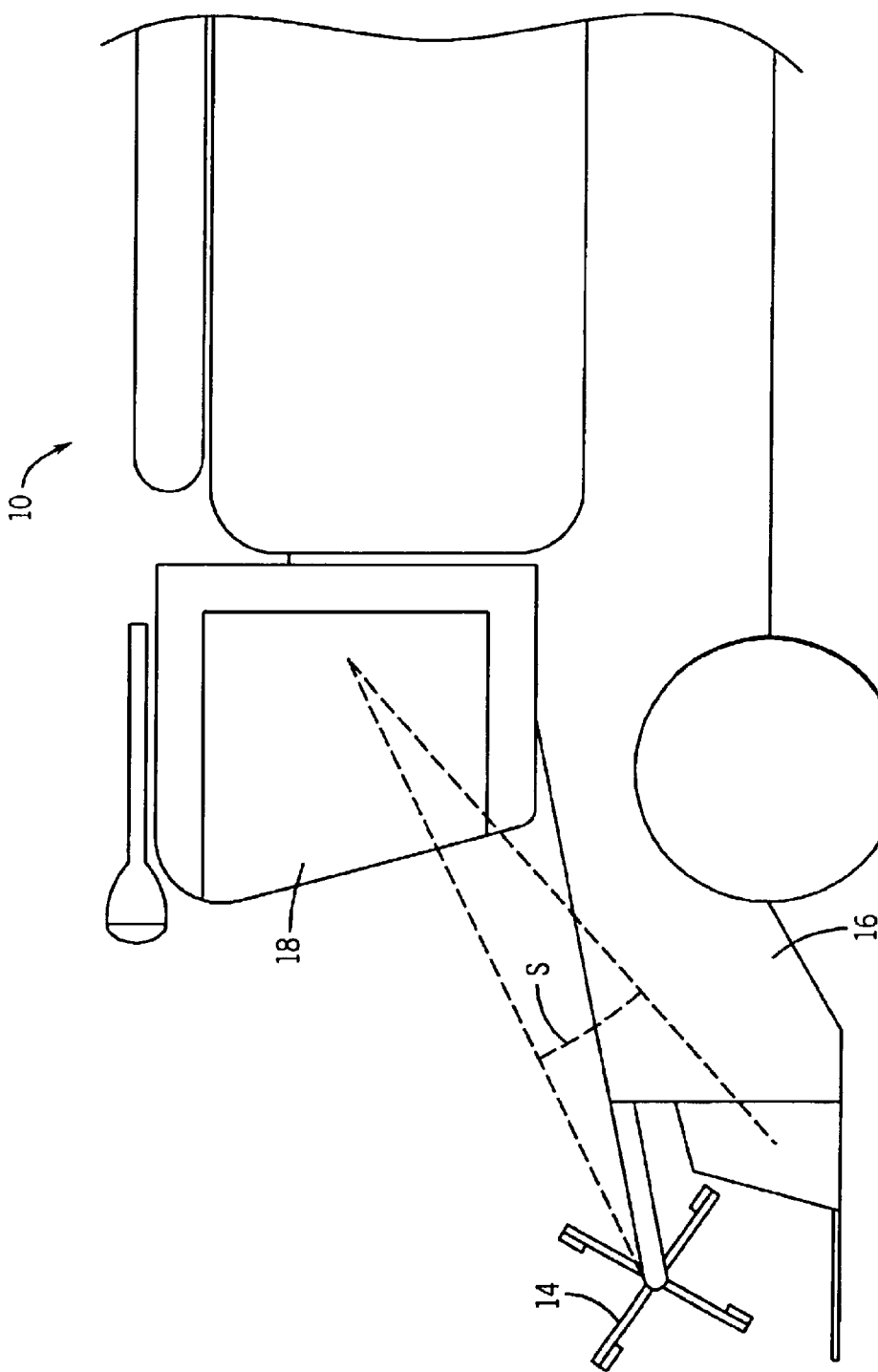
FIG. 1 is a partial view of an embodiment of an agricultural harvesting machine.

An agricultural harvesting machine 10, FIG. 1, has a reel 14, and a feeder 16 for gathering crop and feeding it into agricultural harvesting machine 10. An optional header (not shown) may be used instead of reel 14 depending on the type of crop being harvested. Agricultural harvesting machine 10 includes operator station 18 wherein various control functions of agricultural harvesting machine 10 are monitored and manipulated by an attending operator. A range of visual scan S of the operator extends from the operator rotation 18 to the reel 14.

Figure 2:
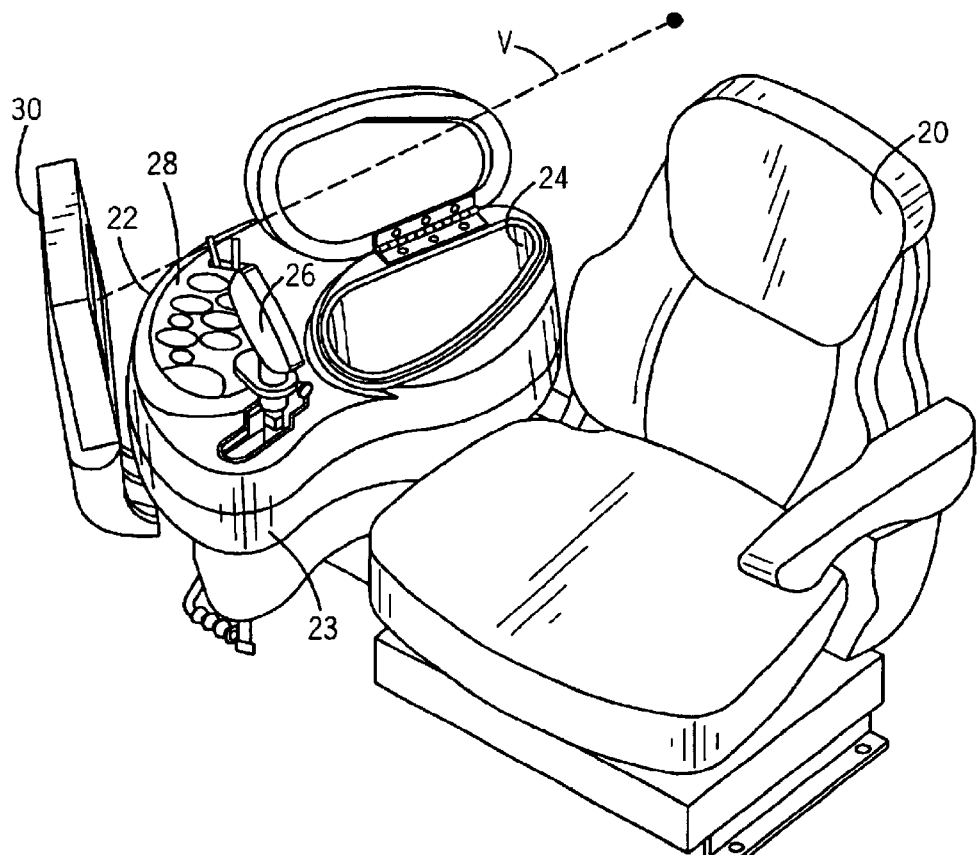
FIG. 2 is a perspective view illustrating an embodiment of an operator station.

Operator station 18, includes an operator seat 20, FIG. 2, and an adjacent control console 22. The control console 22 includes a housing or base 23 supporting a convenient storage compartment 24, a joystick control 26, a control panel 28, having various input buttons and switches, and a touch operated ICDU panel 30. The panel 30 is movable and adjustable relative to the view of the operator, not shown, as indicated by a field of vision V illustrated in phantom. The field of vision V is within the range of visual scan S, discussed above.

Figure 3A:
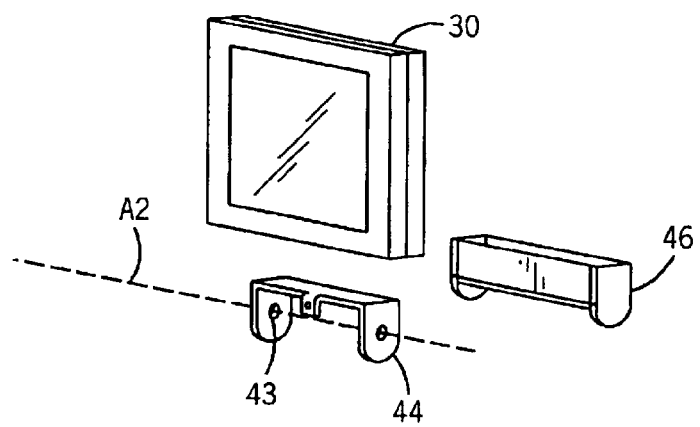
FIGS. 3A and 3B are perspective views illustrating an embodiment of a monitor mount.
Figure 3A:
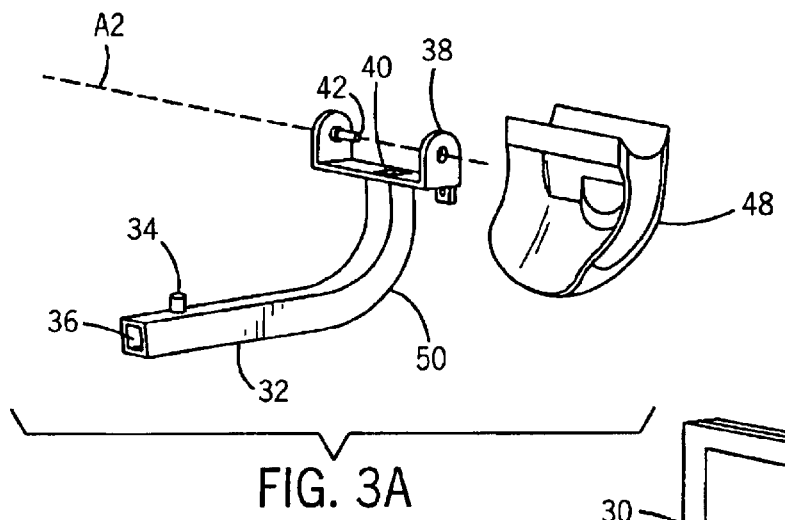
Figure 3B:
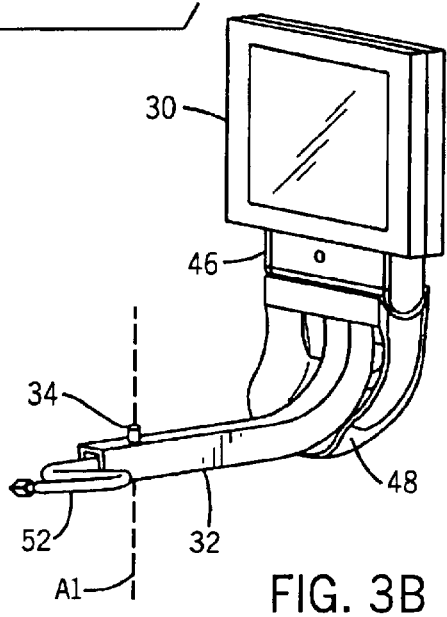

In FIGS. 3A and 3B an elongated member 32 includes a first axis A1 friction pivot connection 34 adjacent a first open end 36 of member 32. A bracket 38 is mounted on a distal or second open end 40 of member 32. A channel extends through member 32 between first open end 36 and second open end 40. The bracket 38 includes a second axis A2 friction pivot connection 42. Panel 30 is mounted on a bracket 44 which pivotably connects to bracket 38 via pivot connection 42 received in a pivot mount 43 and permits panel 30 to tilt or pivot about pivot connection 42. An aesthetic pivot bracket cover 46 mounts over the brackets 38 and 44. Also, an aesthetic cover 48 mounts onto the elongated member 32 adjacent a bend portion 50 of member 32. A power and information cord 52 connects to panel 30, extends through member 32 and exits at open end 36.

Figure 4:
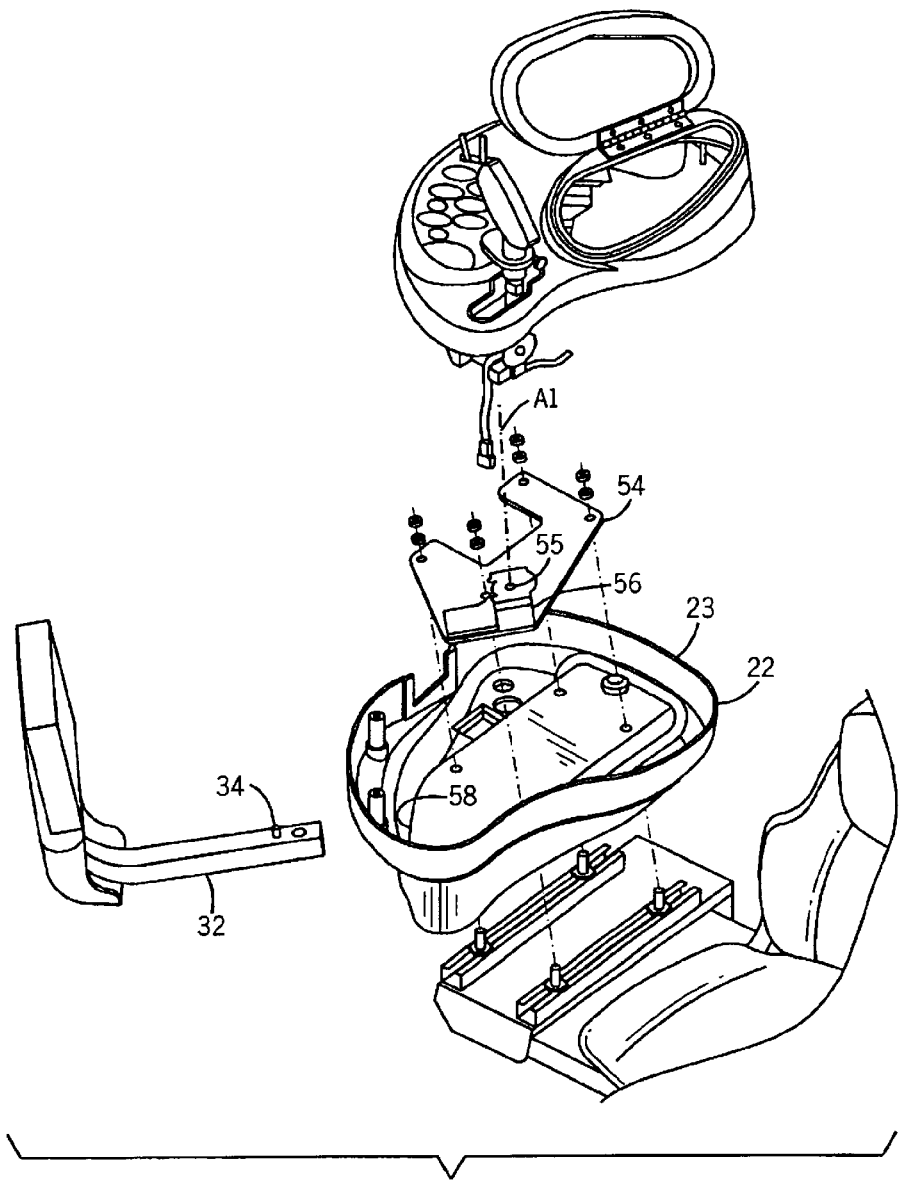
FIG. 4 is an exploded perspective view illustrating an embodiment of a control console, the monitor mount and the operator station.

A bracket 54, FIG. 4, is mounted in console 22 and includes a receiver 56 for receiving member 32 and also includes a pivot mount 55 for receiving pivot connection 34. A slot 58 is provided in console 22 for insertion of member 32. Slot 58 is wide enough to permit swivel movement of member 32.

Figure 5:
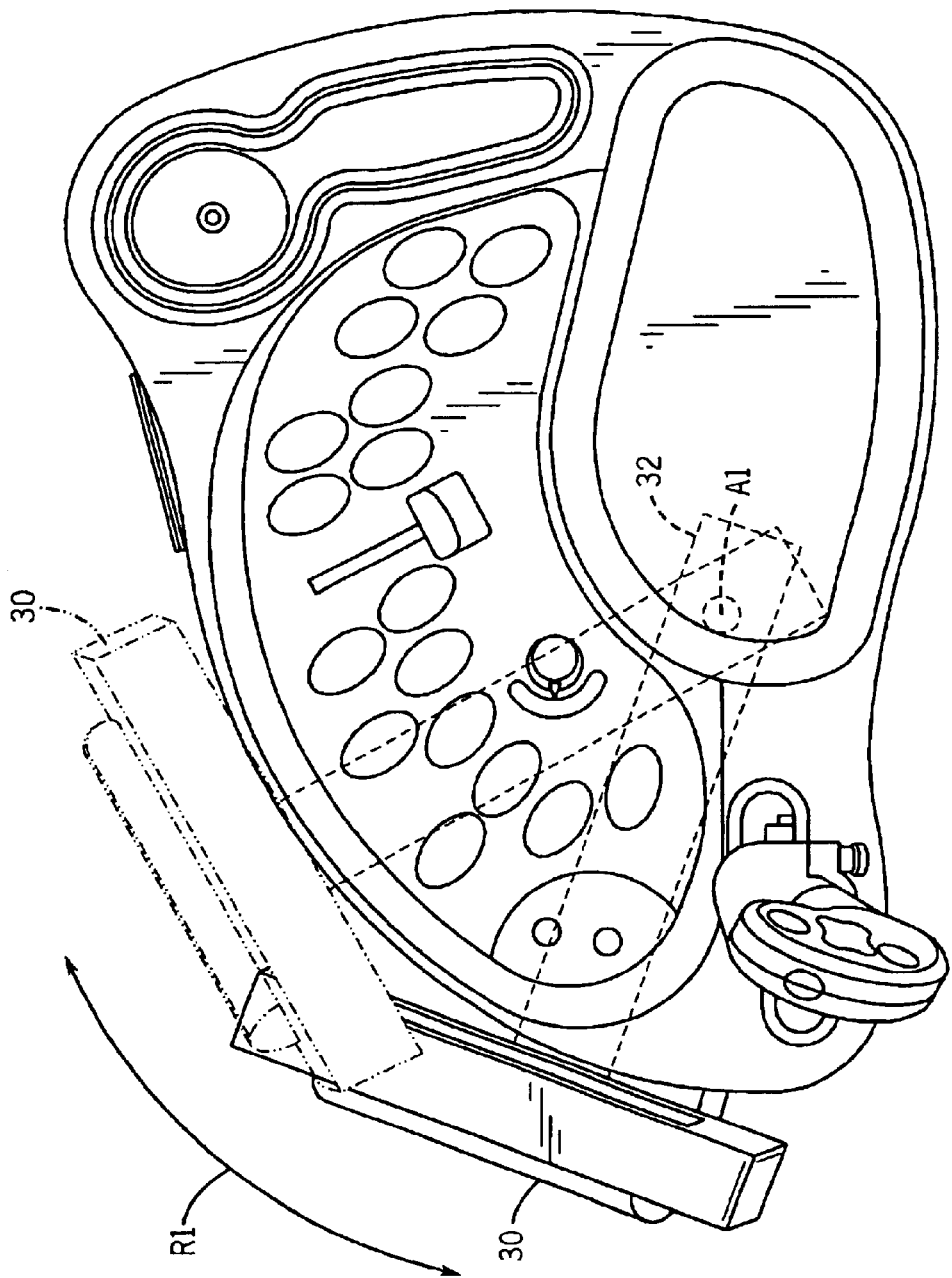
FIGS. 5 and 6 are views illustrating an embodiment of a range of motion for an ICDU.
Figure 6:
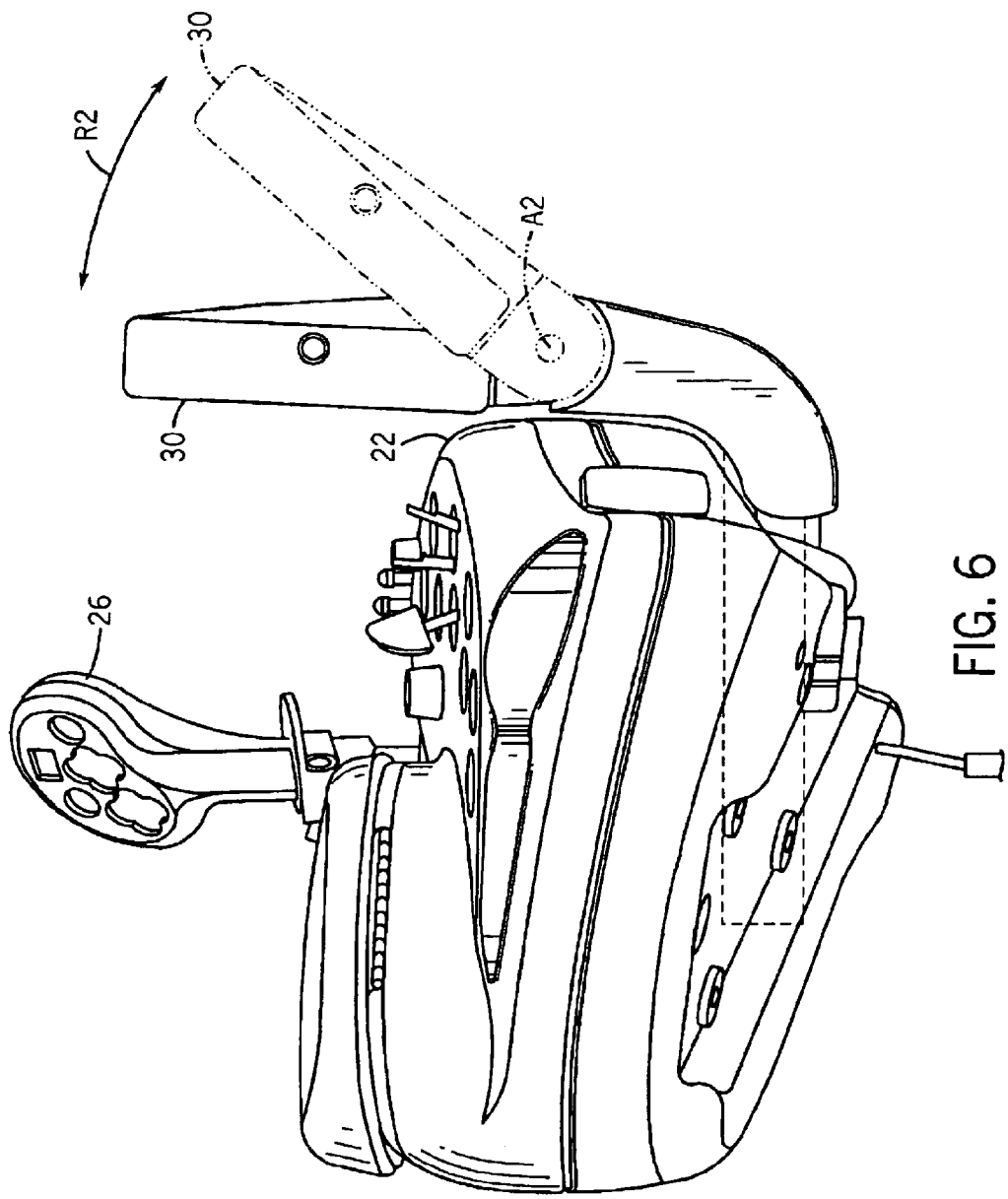

In operation, member 32, FIG. 5, is pivotable about first pivot axis A1 by bi-directional swivel movement of panel 30 through a first arc R1. In addition, panel 30, FIG. 6, is further pivotable about second pivot axis A2 by bi-directional tilt movement of panel 30 through a second arc R2. Axis A1 is substantially orthogonal to axis A2. In this manner, an operator is able to position panel 30 while operating joystick 26 and other control functions of console 22. The pivot connections 34 and 42 include friction bushings which permit the desired position of panel 30 to be maintained. The panel 30 may be moved into and out of the range of visual scan S of the operator, and may be positioned for a desired view angle within the range of visual scan S and within the field of vision V.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A control console comprising:
   a console base;
   at least one control member on the base;
   a first swivel member pivotably connected to the base, whereby the swivel member is pivotable about a first axis;

a second tilt member connected to the swivel member; and an ICDU pivotably attached to the swivel member, whereby the ICDU is pivotable about a second axis, different from the first axis, and wherein the ICDU is pivotable with respect to the console base about both the first and the second axes.

2. The console of claim 1 wherein the second axis is substantially orthogonal to the first axis.

3. The console of claim 2 further comprising:

a frictional connection for maintaining the ICDU in a desired swivel position and tilt position.

4. The console of claim 1 wherein the first swivel member is an elongated channel having a first end connected to the base and having a second distal end supporting the ICDU.

5. The console of claim 1 wherein the ICDU includes a touch operated panel.

6. An adjustable monitor comprising:

an operator station;

an operator control console adjacent to the operator station;

an elongated member with a first end pivotably connected to the operator control console, whereby the elongated member is pivotable about a first axis;

a distal end on the elongated member; and an ICDU pivotably attached to the distal end, whereby the ICDU is pivotable about a second axis, different from the first axis, and wherein the ICDU is pivotable with respect to the control console about both the first and the second axes.

7. The monitor of claim 6 wherein the ICDU is movable to swivel along a first arc and tilt along a second arc.

8. The monitor of claim 7 wherein the first arc is substantially orthogonal to the second arc.

9. The monitor of claim 8 further including:

friction means for maintaining the ICDU in a desired swivel and tilt position.

10. A mounting system for an agricultural harvesting machine comprising:

an agricultural harvesting machine chassis;

an operator station on the chassis;

an operator control console adjacent to the operator station;

an elongated member with a first end pivotably connected to the operator control console, whereby the elongated member is pivotable about a first axis;

a distal end on the elongated member; and an ICDU pivotably attached to the distal end, whereby the ICDU is pivotable about a second axis, different from the first axis, and wherein the ICDU is pivotable with respect to the control console about both the first and the second axes.

11. The system of claim 10, wherein the elongated member includes a cavity throughout its length, whereby a conduit enters the cavity through an opening in the first end and exits the distal end, connecting to the ICDU.

12. The system of claim 10, wherein the first end pivotally attached to the operator control console and the ICDU pivotally attached to the bracket member each include a frictional means for maintaining the ICDU in a desired position.

13. The system of claim 10, wherein the ICDU includes a touch operated screen.

14. The system of claim 10, wherein the operator station includes an operator seat adjacent to the operator control console.

15. The system of claim 10, wherein the second axis is substantially orthogonal to the first axis.

16. An adjustable mount for positioning an electronic display in a agricultural harvesting machine comprising:

an agricultural harvesting machine chassis;

an operator station on the chassis;

an operator seat in the operator station;

an operator control console adjacent to the operator seat;

an elongated member with a first end pivotably connected to the operator seat, whereby the elongated member swivels about a first axis;

a distal end on the elongated member; and an ICDU pivotably attached to the distal end, whereby the ICDU tilts about a second axis which is substantially orthogonal to the first axis, and wherein the ICDU is pivotable with respect to the operator seat about both the first and the second axes.

17. The adjustable mount of claim 16, wherein the elongated member includes a cavity throughout its length, whereby a power and information conduit enters the cavity through an opening in the first end and exits the distal end, connecting to the ICDU.

18. The adjustable mount of claim 16, wherein the first end pivotably attached to the operator control console and the ICDU pivotably attached to the bracket member each include a frictional connection.

19. The adjustable mount of claim 16, wherein the ICDU includes a touch operated screen.

20. The adjustable mount of claim 16, wherein the control console is connected to the operator seat.

21. The adjustable mount of claim 16, wherein the elongated member extends from the control console.

22. An agricultural harvesting machine comprising:

an agricultural harvesting machine chassis;

a means mounted on the chassis for feeding crop material into the agricultural harvesting machine;

an operator station positioned on the chassis such that a range of visual scan is achieved from the operator station to the means for feeding crop material into the agricultural harvesting machine;

an operator control console adjacent to the operator station;

an elongated member with a first end pivotably connected to the operator control console, whereby the elongated member is pivotable about a first axis from a first position in the range of visual scan to a second position out of the range of visual scan;

a distal end on the elongated member; and an ICDU pivotably attached to the distal end, whereby the ICDU is pivotable about a second axis which is substantially different from the first axis, and wherein the ICDU is pivotable with respect to the operator control console about both the first and the second axes.

23. The machine of claim 22, wherein the second axis is substantially orthogonal to the first axis.

* * * * *